(12) United States Patent
Kagei et al.

(10) Patent No.: US 9,337,486 B2
(45) Date of Patent: May 10, 2016

(54) SPINEL-TYPE LITHIUM-MANGANESE COMPOSITE OXIDE

(71) Applicant: Mitsui Mining & Smelting Co., Ltd., Tokyo (JP)

(72) Inventors: Shinya Kagei, Ageo (JP); Natsumi Shibamura, Ageo (JP); Yanko Marinov Todorov, Ageo (JP); Yoshimi Hata, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/430,660

(22) PCT Filed: Sep. 24, 2013

(86) PCT No.: PCT/JP2013/075695
§ 371 (c)(1),
(2) Date: Mar. 24, 2015

(87) PCT Pub. No.: WO2014/050812
PCT Pub. Date: Apr. 3, 2014

(65) Prior Publication Data
US 2015/0255791 A1    Sep. 10, 2015

(30) Foreign Application Priority Data

Sep. 25, 2012  (JP) ................................ 2012-211444

(51) Int. Cl.
*H01M 4/131* (2010.01)
*H01M 4/13* (2010.01)
*H01M 4/505* (2010.01)
(Continued)

(52) U.S. Cl.
CPC ........... *H01M 4/505* (2013.01); *C01G 45/1242* (2013.01); *C01G 53/54* (2013.01); *H01M 4/364* (2013.01); *H01M 4/525* (2013.01); *H01M 4/5825* (2013.01); *H01M 10/0525* (2013.01); *C01P 2002/32* (2013.01); *C01P 2002/72* (2013.01); *C01P 2002/76* (2013.01); *C01P 2004/61* (2013.01); *C01P 2004/62* (2013.01); *C01P 2004/80* (2013.01);
(Continued)

(58) Field of Classification Search
None
See application file for complete search history.

(56) References Cited

U.S. PATENT DOCUMENTS

2010/0243952 A1    9/2010  Kumada et al.
2012/0012776 A1    1/2012  Kagei et al.

FOREIGN PATENT DOCUMENTS

JP    10188979 A    7/1998
JP    10302795 A    11/1998
(Continued)

*Primary Examiner* — Cynthia K Walls
(74) *Attorney, Agent, or Firm* — The Webb Law Firm

(57) ABSTRACT

Provided is a novel spinel-type lithium-manganese composite oxide, allowing gas generation amount to be limited for a gas generated via a reaction with an electrolytic solution. Proposed is a spinel-type lithium-manganese composite oxide, wherein, when the spinel-type lithium-manganese composite oxide is placed in an ion-exchanged water at 20° C., stirred for 10 minutes, then, left to stand undisturbed for 2 minutes, separated into a supernatant and a precipitate and recovered, with respect to the "$16d$-site-to-$32e$-site interatomic distance (100%)" of the spinel-type lithium-manganese composite oxide contained in the precipitate measured by the Rietveld method using the fundamental method, proportionally, the "$16d$-site-to-$32e$-site inter-atomic distance" of the spinel-type lithium-manganese composite oxide contained in the supernatant is less than 101.5%.

11 Claims, 1 Drawing Sheet

(51) Int. Cl.
*C01G 53/00* (2006.01)
*C01G 45/12* (2006.01)
*H01M 4/36* (2006.01)
*H01M 4/525* (2010.01)
*H01M 4/58* (2010.01)
*H01M 10/0525* (2010.01)
*H01M 4/02* (2006.01)

(52) U.S. Cl.
CPC ...... *C01P 2006/12* (2013.01); *H01M 2004/028* (2013.01); *Y02E 60/122* (2013.01); *Y10T 428/2982* (2015.01)

(56) References Cited

FOREIGN PATENT DOCUMENTS

| | | |
|---|---|---|
| JP | 10340726 A | 12/1998 |
| JP | 11073962 A | 3/1999 |
| JP | 2000235857 A | 8/2000 |
| JP | 2000306577 A | 11/2000 |
| JP | 2003197194 A | 7/2003 |
| JP | 2012116720 A | 6/2012 |
| WO | 2009054436 A1 | 4/2009 |
| WO | 2010114015 A1 | 10/2010 |
| WO | 2012118117 A1 | 9/2012 |
| WO | 2013100070 A1 | 7/2013 |

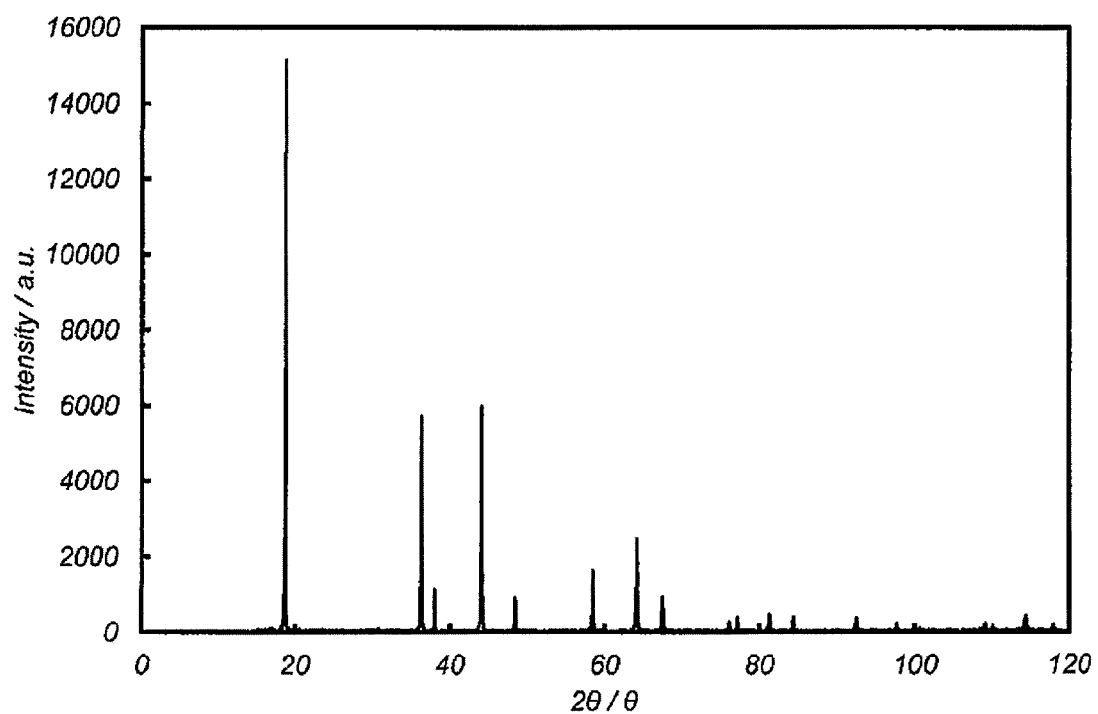

US 9,337,486 B2

SPINEL-TYPE LITHIUM-MANGANESE COMPOSITE OXIDE

CROSS-REFERENCE TO RELATED APPLICATIONS

This application is the United States national phase of International Application No. PCT/JP2013/075695 filed Sep. 24, 2013, and claims priority to Japanese Patent Application No. 2012-211444 filed Sep. 25, 2012, the disclosures of which are hereby incorporated in their entirety by reference.

TECHNICAL FIELD

The present invention relates to a spinel-type lithium-manganese composite oxide that can be used as a positive electrode active substance for a lithium secondary battery, and containing at least lithium and manganese.

TECHNICAL BACKGROUND

Lithium secondary batteries have such characteristics as a high energy density and a long life span. Therefore, lithium secondary batteries are used widely as power sources for home appliances such as video cameras and portable electronic devices such as notebook personal computers and mobile phones, electric tools such as power tools, and the like, and recently have been put into application in large batteries that equip an electric vehicle (EV), a hybrid electric vehicle (HEV) and the like.

A lithium secondary battery is a secondary battery having a structure in which, during charging, lithium melts out from the positive electrode as an ion and moves towards the negative electrode to be stored and conversely, during discharging, the lithium ion returns from the negative electrode to the positive electrode, and it is known that the source of the high energy density of the battery lies in the electric potential of the positive electrode material.

Known as positive electrode active materials for lithium secondary batteries of this species, are spinel-type composite oxides containing lithium and manganese having a spinel structure (Fd-3m) of the manganese series, such as $LiMn_2O_4$, and $LiNi_{0.5}Mn_{1.5}O_4$, in addition to lithium transition metal oxides such as $LiCoO_2$, $LiNiO_2$ and $LiMnO_2$ having a layer structure.

Owing to low raw material costs and the absence of toxicity, which renders it safe, and further more, having the property of being strong against over-charging, there is a focus on this species of spinel-type lithium-manganese composite oxide as a next-generation positive electrode active material for use in a large battery for an electric vehicle (EV), a hybrid electric vehicle (HEV) and the like. In addition, a spinel-type lithium transition metal oxide (LMO), which allows for insertion and desorption of Li ions three-dimensionally, has excellent output characteristics, compared to a lithium transition metal oxide such as $LiCoO_2$, which has a layer structure, such that utilization in applications requiring excellent output characteristics such as EV batteries, HEV batteries, and the like, is anticipated.

Above all, it is now known that substituting a portion of the Mn sites in $LiMn_2O_4$ with another transition metal (Cr, Co, Ni, Fe or Cu) gives an operating electric potential of close to 5 V, and a considerable amount of development is currently under way for a manganese series spinel-type lithium transition metal oxide having an operating electric potential of 4.5 V or higher (5 V-class).

For instance, as a positive electrode active substance for a lithium secondary battery exhibiting a 5 V-class electromotive force, Patent Document 1 describes a high-capacity spinel-type lithium-manganese composite oxide positive electrode active substance, comprising a spinel-type lithium-manganese composite oxide added with chromium as an essential additive component, and further, nickel or cobalt.

Patent Document 2 describes a crystal $LiMn_{2-y-z}Ni_yM_zO_4$ (where M represents at least one species chosen from the group comprising Fe, Co, Ti, V, Mg, Zn, Ga, Nb, Mo and Cu; and $0.25 \leq y \leq 0.6$, $0 \leq z \leq 0.1$) having a spinel structure carrying out charge-discharging with an electric potential of 4.5 V or higher relative to Li metal.

As a positive electrode material for a high energy density lithium ion secondary battery having a high voltage of 4.5 V or higher relative to Li, Patent Document 3 describes a spinel-type lithium-manganese composite oxide represented by $Li_a(M_xMn_{2-x-y}A_y)O_4$ (where $0.4<x$, $0<y$, $x+y<2$, $0<a<1.2$; and M contains one or more species of metal elements chosen from the group comprising Ni, Co, Fe, Cr and Cu, and contains at least Ni; A contains at least one species of metal element chosen from Si and Ti, with the value of y, which is the ratio for A, being $0.1<y$, when A only contains Ti).

As a positive electrode active substance whereby the capacity density becomes high owing to the tap density of the positive electrode active substance and the initial discharge capacity of a secondary battery using this positive electrode active substance being both high, Patent Document 4 describes a lithium nickel manganese composite oxide having a spinel structure represented by formula (I): $Li_{1+x}Ni_{0.5-1/4x-1/4y}Mn_{1.5-3/4x-3/4y}B_yO_4$ (in formula (I), x and y satisfy $0 \leq x \leq 0.025$ and $0 < y \leq 0.01$); the lithium nickel manganese composite oxide having a median diameter of 5 to 20μ, a particle size variation coefficient of 2.0 to 3.5%, and a BET specific surface area of 0.30 to 1.30 m/g.

A problem exists, that when lithium nickel manganese composite oxides having a spinel structure are used as positive electrode active substances in lithium secondary batteries, sometimes, the electrolytic solution decomposes and generates gas. Among them, for manganese series spinel-type lithium transition metal oxides having an operating electric potential of 4.5 V or higher (5 V-class), it is a crucial problem that should be solved in particular.

As a cause of such gas generation, a prior art thought is that an impurity contained in a positive electrode active substance reacts with the electrolytic solution to generate the gas, which has led to the method of removing water-soluble impurities by washing with water being proposed.

For instance, Patent Document 5 describes a production method for a positive electrode active substance for a non-aqueous electrolytic solution secondary battery, wherein a lithium compound, a manganese compound, and at least one species of metal or metal compound chosen from the group comprising Ni, Al, Co, Fe, Mg and Ca are mixed and fired to obtain a lithium manganese oxide, then, this lithium manganese oxide is washed with water and then filtered and dried, thereby obtaining the positive electrode active substance for a non-aqueous electrolytic solution secondary battery.

Elsewhere, Patent Documents 6, 7, 8, and the like, also describe methods for removing impurities on a particle surface by water-washing a spinel-type lithium transition metal oxide obtained by firing.

PRIOR ART DOCUMENTS

Patent Documents

[Patent Document 1] Japanese Patent Application Laid-open No. H11-73962
[Patent Document 2] Japanese Patent Application Laid-open No. 2000-235857
[Patent Document 3] Japanese Patent Application Laid-open No. 2003-197194
[Patent Document 4] Japanese Patent Application Laid-open No. 2012-116720
[Patent Document 5] Japanese Patent Application Laid-open No. 2000-306577
[Patent Document 6] Japanese Patent Application Laid-open No. H10-340726
[Patent Document 7] Japanese Patent Application Laid-open No. H10-188979
[Patent Document 8] Japanese Patent Application Laid-open No. H10-302795

However, there are cases where gas generation cannot be effectively prevented by merely washing with water to remove water-soluble impurities as described above. In particular, regarding a spinel-type lithium-manganese composite oxide having an operating electric potential of 4.5 V or higher (5 V-class) (also referred to as a '5 V-class spinel), merely washing with water cannot effectively limit the amount of generation for a gas generated via a reaction with the electrolytic solution.

Consequently, regarding spinel-type lithium-manganese composite oxides, among which, regarding spinel-type lithium-manganese composite oxides demonstrating an operating electric potential of 4.5 V or higher (5 V-class) in particular, the present invention provides a novel spinel-type lithium-manganese composite oxide allowing the amount of generation for a gas generated via a reaction with an electrolytic solution to be limited effectively.

SUMMARY OF THE INVENTION

The present invention proposes a spinel-type lithium-manganese composite oxide having a crystal structure belonging to the space group Fd-3m, wherein, when the spinel-type lithium-manganese composite oxide is placed in an ion-exchanged water at 20° C., stirred for 10 minutes, then, left to stand undisturbed for 2 minutes, separated into a supernatant and a precipitate and recovered, with respect to the "16$d$-site-to-32$e$-site inter-atomic distance (100%)" of the spinel-type lithium-manganese composite oxide contained in the precipitate measured by the Rietveld method using the fundamental method, proportionally, the "16$d$-site-to-32$e$-site inter-atomic distance" of the spinel-type lithium-manganese composite oxide contained in the supernatant is less than 101.5%.

The present invention in addition proposes a spinel-type lithium-manganese composite oxide having a crystal structure belonging to the space group Fd-3m, wherein, when the spinel-type lithium-manganese composite oxide is placed in an ion-exchanged water at 20° C., stirred for 10 minutes, then, left to stand undisturbed for 2 minutes, separated into a supernatant and a precipitate and recovered, with respect to the "8$a$-site-to-32$e$-site inter-atomic distance (100%)" of the spinel-type lithium-manganese composite oxide contained in the precipitate measured by the Rietveld method using the fundamental method, proportionally, the "8$a$-site-to-32$e$-site inter-atomic distance" of the spinel-type lithium-manganese composite oxide contained in the supernatant exceeds 97.4%.

The present inventors discovered that the amount of generation for a gas generated via a reaction with the electrolytic solution could be effectively limited, not by water-washing a spinel-type lithium-manganese composite oxide obtained by firing and removing water-soluble impurities, but by introducing a spinel-type lithium-manganese composite oxide obtained by firing into water, stirring, and, based on a difference in sedimentation speeds, removing microparticles having a slow sedimentation speed.

In addition, the inventors found that microparticles with an insufficient crystal growth of spinel-type lithium-manganese composite oxide, which are attached on the surface of spinel-type lithium-manganese composite oxide particles, are contained in the microparticles that are removed based on such a sedimentation speed difference. These have high reactivity with the electrolytic solution and are thus thought to be a cause of the gas generation. Then, in a spinel-type lithium-manganese composite oxide with an insufficient crystal growth, the "16$d$-site-to-32$e$-site inter-atomic distance" tends to be longer, and the "8$a$-site-to-32$e$-site inter-atomic distance" tends to become shorter, compared to one with a sufficient crystal growth.

Thus, based on such points of view, common denominators were investigated for the spinel-type lithium-manganese composite oxides obtained as above, and the inventors found that, from a spinel-type lithium-manganese composite oxide placed in an ion-exchanged water at 20° C., stirred for 10 minutes, then, left to stand undisturbed for 2 minutes, and separated into a supernatant and a precipitate, with respect to the "16$d$-site-to-32$e$-site inter-atomic distance" of the spinel-type lithium-manganese composite oxide contained in this precipitate, proportionally, the "16$d$-site-to-32$e$-site inter-atomic distance" of the spinel-type lithium-manganese composite oxide contained in this supernatant was less than 101.5%, and this proportion exceeded 97.4% regarding the "8$a$-site-to-32$e$-site inter-atomic distance", and devised the present invention.

The spinel-type lithium-manganese composite oxide proposed by the present invention can effectively limit the amount of generation for a gas generated via a reaction with the electrolytic solution and thus, can be used suitably as a positive electrode active substance of various lithium batteries.

BRIEF DESCRIPTION OF THE DRAWING

The drawing depicts a XRD pattern of a spinel-type lithium-manganese-nickel composite oxide obtained in Example 1.

DETAILED DESCRIPTION OF THE INVENTION

Hereinafter, the present invention will be described based on exemplary embodiments for carrying out the present invention. However, the present invention is not limited to the embodiments described below.

\<Present Spinel\>

As long as the lithium-manganese composite oxide has a crystal structure belonging to the space group Fd-3m, the spinel-type lithium-manganese composite oxide (referred to as "the present spinel") according to an exemplary embodiment of the present invention, may be a 4 V-class spinel-type lithium-manganese composite oxide (also referred to as "the present 4 V-class spinel") having an operating electric potential of 3.5 V or higher but lower than 4.5 V, or a 5 V-class spinel-type lithium-manganese composite oxide (referred to as "the present 5 V-class spinel") having an operating electric potential of 4.5 V or higher.

As the present 4 V-class spinel, a powder (referred to as "the present spinel powder") containing as the main constituent a spinel-type lithium-manganese composite oxide particle (referred to as "the present spinel particle") containing a crystal phase comprising $LiMn_2O_{4-\delta}$ wherein a portion of the Mn sites has been substituted by a transition metal, can be cited.

Herein, unless expressly stated otherwise, "contains as the main constituent" includes the meaning of allowing other constituents to be contained to such an extent that the functions of the main constituent cannot be prevented. Although not to specify the proportional content of the main constituent, occupying at least 70 percent by mass or more, of which 90 percent by mass or more, of which 95 percent by mass or more (including 100%) is desirable. Thus, the present spinel powder allows a constituent other than the present spinel particle to be contained (and likewise for "contains as the main constituent" elsewhere).

As the present 5 V-class spinel, a powder (referred to as "the present spinel powder") containing as the main constituent a spinel-type lithium-manganese composite oxide particle (referred to as "the present spinel particle") containing a crystal phase comprising $LiMn_2O_{4-\delta}$ wherein a portion of the Mn sites has been substituted by Li, a metal element M1 and another metal element M2, can be cited.

The metal element M1 is a substitution element mainly contributing in exhibiting an operating electric potential of 4.5 V or higher at a metal Li reference electric potential, and for which Ni, Co and Fe, and the like, can be cited; it suffices that at least one species among these is contained, and other metal elements may be contained as M1.

The metal element M2 is a substitution element mainly contributing in stabilizing the crystal structure to elevate the characteristics; for instance, as substitution elements contributing in improving the capacity maintenance rate, for instance, Mg, Ti, Al, Ba, Cr, Nb, and the like, can be cited. It suffices that at least one species among these Mg, Ti, Al, Ba, Cr and Nb is contained, and the metal elements may be contained as M2.

As an example of the present spinel particle of the 5 V-class, the spinel-type lithium-manganese composite oxide represented by formula (1): $Li[Li_aMn_{2-a-c}M1_bM2_c]O_{4-\delta}$ can be cited.

In the above formula (1), it suffices that "a" is 0.00 to 1.0, of which 0.01 or greater or 0.5 or less, and of which 0.02 or greater or 0.33 or less, are all the more desirable.

It suffices that "b", which represents the content in M1, is 0.30 to 0.70, of which 0.35 or greater or 0.60 or less, and of which 0.40 or greater or 0.60 or less, are all the more desirable.

It suffices that "c", which represents the content in M2, is 0.001 to 0.400, of which 0.002 or greater or 0.100 or less, and of which 0.005 or greater or 0.050 or less, are all the more desirable.

In each of the above formulae, "4−δ" indicates that the oxide may contain an oxygen deficiency, and a portion of the oxygen atoms may be substituted by a fluorine.

However, to the extent that the functions of Li, Mn, M1, M2 and O are not completely prevented, the present spinel particle may contain other constituents. In particular, the other elements may be contained if at 0.5% by weight or less respectively. The reason is that an amount on this order is thought to have almost no effect on the performance of the present spinel particle.

In addition, the present spinel may contain B. In so doing, a composite oxide phase containing Ni, Mn and B may be contained as a state in which B is present, in addition to the spinel crystal phase.

As the composite oxide phase containing Ni, Mn and B, for instance, a crystal phase of $Ni_5MnO_4(BO_3)_2$ can be cited.

Whether a crystal phase of $Ni_5MnO_4(BO_3)_2$ is contained can be verified by comparing a diffraction pattern obtained X-ray diffraction (XRD) to the PDF (Powder Diffraction File) No. "01-079-1029".

The composite oxide containing Ni, Mn and B, is inferred to be on the surface or at the grain boundary of the present spinel particle.

With regard to the content in the composite oxide phase containing Ni, Mn and B, it is desirable that the composite oxide phase be contained so that the B element content in the present spinel powder is 0.02 to 0.80% by mass, of which 0.05% by mass or more or 0.60% by mass or less, of which 0.10% by mass or more or 0.30% by mass or less, and in particular 0.25% by mass or less, are further desirable contents in the composite oxide phase.

If the B element content is 0.02% by mass or more, a discharge capacity at high temperature (for instance, 45° C.) can be maintained, and if the B element content is 0.80% by mass or less, rating characteristics can be maintained, which is desirable.

(Supernatant-to-precipitate Me-O Distance Ratio)

For the present spinel, when the spinel-type lithium-manganese composite oxide is placed in an ion-exchanged water at 20° C., stirred for 10 minutes, then, left to stand undisturbed for 2 minutes, separated into a supernatant and a precipitate and recovered, with respect to the "16d-site-to-32e-site inter-atomic distance (also referred to as the "Me-O distance") (100%)" of the spinel-type lithium-manganese composite oxide contained in the precipitate measured by the Rietveld method using the fundamental method, proportionally, the "16d-site-to-32e-site inter-atomic distance (Me-O distance)" of the spinel-type lithium-manganese composite oxide contained in the supernatant is preferably less than 101.5%, of which 101.2% or less, and of which 101.0%, are desirable.

In a spinel-type lithium-manganese composite oxide with an insufficient crystal growth, the Me-O distance tends to be longer compared to one with a sufficient crystal growth. It follows that, an Me-O distance in the spinel-type lithium-manganese composite oxide contained in the supernatant of less than 101.5% in proportion with respect to the Me-O distance (100%) of the spinel-type lithium-manganese composite oxide contained in the precipitate confirms that the Me-O distance in the spinel-type lithium-manganese composite oxide contained in the supernatant, while being somewhat long, is almost identical to that in the precipitate, therefore confirming that, at least on the surface of the present spinel particle, microparticles comprising a spinel-type lithium-manganese composite oxide with an insufficient crystal growth are largely absent. And then, it was found that, if the present spinel was of such kind, the amount of generation for a gas generated via a reaction with the electrolytic solution could be limited effectively.

(Supernatant-to-precipitate Li—O Distance Ratio)

For the present spinel, in addition, when the spinel-type lithium-manganese composite oxide is placed in an ion-exchanged water at 20° C., stirred for 10 minutes, then, left to stand undisturbed for 2 minutes, separated into a supernatant and a precipitate and recovered, with respect to the "8a-site-to-32e-site inter-atomic distance (also referred to as the "Li—O distance") (100%)" of the spinel-type lithium-manganese composite oxide contained in the precipitate measured by the Rietveld method using the fundamental method, proportionally, the "8a-site-to-32e-site inter-atomic distance (Li—O distance)" of the spinel-type lithium-manganese composite oxide contained in the supernatant preferably exceeds 97.4%, of which 97.5% or greater is desirable.

In a spinel-type lithium-manganese composite oxide with an insufficient crystal growth, the Li—O distance tends to be longer compared to one with a sufficient crystal growth. It follows that, an Li—O distance in the spinel-type lithium-manganese composite oxide contained in the supernatant exceeding 97.4% in proportion with respect to the Me-O distance (100%) of the spinel-type lithium-manganese composite oxide contained in the precipitate confirms that the Li—O distance in the spinel-type lithium-manganese composite oxide contained in the supernatant, while being somewhat short, is almost identical to that in the precipitate, therefore confirming that, at least on the surface of the present spinel particle, microparticles comprising a spinel-type lithium-manganese composite oxide with an insufficient crystal growth are largely absent. And then, it was found that, if the present spinel was of such kind, the amount of generation for a gas generated via a reaction with the electrolytic solution could be limited effectively.

(D50)

It is desirable for the present spinel powder that D50 according to the volume-based particle size distribution obtained via measurements by the laser diffraction/scattering particle size distribution measurement method is 5 μm to 40 μm, of which 10 μm or larger or 40 μm or smaller, and of which 13 μm or larger or 30 μm or smaller, are particularly desirable.

From the point of view of electrode production, it is convenient if the D50 of the present spinel powder is 5 μm to 40 μm.

In order to adjust in this way the D50 of the present spinel powder to the range mentioned above, it suffices to adjust the firing condition (temperature, time, atmosphere and the like) or the post-firing crushing power (crushing machine rotation speed and the like). However, there is no limitation to these methods.

(D10)

It is desirable for the present spinel powder that D10 according to the volume-based particle size distribution obtained via measurements by the laser diffraction/scattering particle size distribution measurement method is 2 μm to 15 μm, of which 3 μm or larger or 14 μm or smaller, and of which 4 μm or larger or 13 μm or smaller, are particularly desirable.

Desirable points are that if the D10 of the present spinel powder is 2 μm or larger, the dispersibility of the slurry during electrode coating becomes more satisfactory, and if 15 μm or smaller, the significant decrease in the viscosity of the slurry during electrode coating can be suppressed.

In order to adjust in this way the D10 of the present spinel powder to the range mentioned above, it suffices to adjust the firing condition (temperature, time, atmosphere and the like) or the post-firing crushing power (crushing machine rotation speed and the like). However, there is no limitation to these methods.

(Dmin)

It is desirable for the present spinel powder that Dmin according to the volume-based particle size distribution obtained via measurements by the laser diffraction/scattering particle size distribution measurement method is 5.0 μm or smaller, of which 0.1 μm or larger, of which 0.3 μm or larger, and of which in particular 0.5 μm or larger or 3.0 μm or smaller, are particularly desirable.

A Dmin of 5.0 μm or smaller for the present spinel powder means that the present spinel particle of at least 5.0 μm in particle size is included, which is distinct from one obtained by removing all microparticle powder through sorting.

In order to adjust in this way the Dmin of the present spinel powder to the range mentioned above, it suffices to remove the microparticle powder attached on the surface of the present spinel particle by utilizing a difference in the sedimentation speed, as described later. However, there is no limitation to these methods.

(Specific Surface Area)

The specific surface area of the present spinel particle is preferably 0.01 to 3.00 m$^2$/g or smaller, of which 0.10 m$^2$/g or larger or 1.00 m$^2$/g or smaller is desirable, and of which 0.50 m$^2$/g or smaller is further desirable.

Generally, the technical common knowledge is that when the specific surface area increases, the reactivity with the electrolytic solution increases, facilitating gas generation. However, the present spinel powder is characterized on the point that a suppression of gas generation is enabled despite having a specific surface area of on the same order as a prior art spinel-type lithium-manganese composite oxide.

<Production Method for the Present Spinel Powder>

The present spinel powder can be obtained by mixing raw materials, for instance, raw materials such as a lithium salt compound, a manganese salt compound, an M1 metal salt compound, and an M2 metal salt compound, grinding with a wet-grinding machine or the like, then, granulating and drying using a thermal spray-dryer or the like, firing, as necessary heating, further sorting as necessary, then, placing into water and stirring the obtained spinel-type lithium-manganese composite oxide, and utilizing the sedimentation speed difference to remove the particles with a slow sedimentation speed and recover the precipitate with a fast sedimentation speed.

However, the production method for the present spinel powder is not limited to such a production method. In particular, the production method prior to placing into water and stirring the spinel-type lithium-manganese composite oxide is arbitrary. For instance, the granulation powder to be supplied to firing may be produced by the so-called co-precipitation method, and the separation means after firing may be changed to another method.

As lithium salt compounds, for instance, lithium hydroxide (LiOH), lithium carbonate ($Li_2CO_3$), lithium nitrate ($LiNO_3$), $LiOH \cdot H_2O$, lithium oxide ($Li_2O$), and other fatty acid lithium salts and lithium halides, and the like, may be cited. Desirable among these are hydroxide salt, carbonate and nitrate, of lithium.

As for manganese salt compounds, there is no particular restriction. For instance manganese carbonate, manganese nitrate, manganese chloride, manganese dioxide, manganese (III) oxide, manganese(II,III) oxide and the like, can be used, of which manganese carbonate and manganese dioxide are desirable. Particularly desirable among these is electrolytic manganese dioxide obtained by the electrolysis method.

As M1 metal salt compounds and M2 metal salt compounds, carbonate, nitrate, chloride, oxyhydroxide salt, hydroxide, and the like, of M1 or M2 metal can be used.

A boron compound may be mixed among the raw materials. It suffices that the boron compound is a compound containing boron (B element), and, for instance, using boric acid or lithium borate is desirable. Lithium borate can be used in various morphologies such as, for instance, lithium metaborate ($LiBO_2$), lithium tetraborate ($Li_2B_4O_7$), lithium pentaborate ($LiB_5O_8$) and lithium perborate ($Li_2B_2O_5$).

Mixing such boron compounds generates the composite oxide phase containing Ni, Mn and B, for instance, a crystal phase of $Ni_5MnO_4(BO_3)_2$, in addition to the crystal phase of the present spinel.

For the mixing of the raw materials, slurrying by adding a liquid medium such as water or a dispersant and wet-mixing is desirable, and grinding the obtained slurry with a wet-grinding machine is desirable. However, dry-grinding may also be used.

As long as the various raw materials that were ground in the previous step are dispersed within the granulation particles without being separated, the granulation method may be wet or dry, and may be an extruding granulation method, a tumbling granulation method, a fluidized granulation method, a mixing granulation method, a spray-drying granulation method, a press-forming granulation method, or a flake granulation method using a roll or the like. However, if wet-granulation is performed, thoroughly drying is required prior to firing. As the drying method, it suffices to dry by a well-known drying method such as a spray heat drying method, a hot-air drying method, a vacuum drying method or a freeze-drying method, of which the spray heat drying method is desirable. The spray heat drying method is preferably carried out using a thermal spray-dryer (spray-dryer).

For firing, performing firing so as to maintain the substance for 0.5 hours to 300 hours in a firing oven, under air atmosphere, under an oxygen partial pressure-adjusted atmosphere, or under a carbon dioxide gas atmosphere, or under another atmosphere, at a temperature of 800 to 1000° C., of which a temperature of 900 to 1000° C. (: meaning the temperature when a thermocouple is in contact with a substance being fired inside the firing oven), is desirable. In so doing, it is desirable to select a firing condition in which the transition metal solid-solubilizes at atomic level and exhibits a single phase.

The type of firing oven is not limited in particular. Firing can be performed using, for instance, a rotary kiln, a static coven, or other firing ovens.

For the heat-treatment, it is desirable to facilitate incorporation of oxygen by placing the substance for 0.5 to 300 hours in an environment under air atmosphere at 500° C. to 800° C., and preferably at 700° C. or higher or 800° C. or lower.

After firing or heating in this way and as necessary after crushing and sorting, the present spinel powder can be obtained by repeating at least once, preferably twice or more, a series of separation treatment comprising introducing the obtained spinel-type lithium-manganese composite oxide (powder) into water, stirring with a stirring means such as an agitator, thereafter, letting to stand undisturbed as appropriate, removing the supernatant and recovering the precipitate.

The water into which the spinel-type lithium-manganese composite oxide (powder) is introduced preferably is at pH 6 to 7, at a temperature of 15 to 25° C., and is 1.2 to 2 times in volume with respect to the spinel-type lithium-manganese composite oxide (powder).

A solution other than water can also be used, such as ethanol.

The water bath in which the water is introduced, preferably, has a size of 200 mL to 5000 mL.

As stirring means, a suitable stirrer such as from an agitator or a magnetic stirrer can be used, and stirring at a stirring speed of an extent that the causes the powder to flow without precipitating, for instance, at a rotation speed of 200 to 250 rpm as an approximation, is desirable.

For the time left standing undisturbed after stirring, setting a time that is suitable for most of the powder to precipitate and the fine powder to be in a floating state is desirable, and as an approximation, for instance, 1 minute to 5 minutes is desirable, of which 2 minutes or longer or 3 minutes or shorter, is particularly preferable.

For the recovered spinel-type lithium-manganese composite oxide (powder), heating at 300° C. or higher, or the like, and sufficiently removing H (hydrogen) in the vicinity of the surface is desirable.

<Application of the Present Spinel Powder>

After being crushed and sorted as necessary, the present spinel powder can be effectively utilized as a positive electrode active substance for various lithium batteries.

When using the present spinel powder as a positive electrode active substance of various lithium batteries, a positive electrode mixture can be produced by mixing, for instance, the present spinel powder, a conductor comprising carbon black, or the like, and a binding agent comprising Teflon (registered trade mark) binder, or the like. Then, a lithium battery can be constituted by using such positive electrode mixture as the positive electrode, by using lithium or a material capable of storing and releasing lithium, such as carbon, as the negative electrode, and by using a lithium salt such as lithium hexafluorphosphate ($LiPF_6$) dissolved in a mixed solvent such as ethylene carbonate-dimethyl carbonate as the non-aqueous electrolyte.

A lithium battery constituted in this way can be used in, for instance, electronic devices such as notebook personal computers, mobile phones, cordless phone handsets, video movies, liquid crystal televisions, electric shavers, portable radios, headphone stereos, backup power sources, and memory cards, medical devices such as pace makers and hearing aids, and on-board drive power for electric cars. The battery is particularly effective as a driving power source for, among the above, cellular phones, various portable computers such as PDAs (portable information terminals) and notebook personal computers, electric cars (including hybrid cars), power supply for power storage, and the like, which require excellent cycle characteristics.

<Explanation of Expressions>

In the present Specification, when the expression "X to Y" (X and Y are any numbers) is used, unless explicitly stated otherwise, the meaning of "X or greater but Y or lower" is included and at the same time the meaning of "preferably greater than X" or "preferably less than Y" is included.

In addition, the expression "X or greater" (X is any number) or "Y or less" (Y is any number) includes the intention to the effect of "greater than X is desirable" or "less than Y is desirable".

In addition, unless explicitly stated otherwise, each range of values defined in the present invention includes a range falling within the range of an upper limit value and a lower limit value when rounded off. However, preferably, within the range of values wherefrom the digits below the significant number have been dropped.

EXAMPLES

In the following, the present invention will be described further based on examples. However, the present invention is not to be limited to the examples indicated below.

Comparative Example 1

Lithium carbonate, electrolytic manganese dioxide, nickel hydroxide, titanium oxide and lithium tetraborate ($Li_2B_4O_7$) were weighed so as to obtain 3.9% by mass of Li, 40.1% by mass of Mn, 15.5% by mass of Ni, 5.3% by mass of Ti and 0.14% mass of B, added with water, mixed and stirred to prepare a slurry having a solid content concentration of 10 wt %.

The obtained slurry (raw material powder 500 g) was added with an ammonium salt of a polycarboxylic acid (SN DISPERSANT 5468, manufactured by San Nopco Limited) as a dispersant in the amount of 6 wt % of the solid content of the slurry, and ground with a wet-grinding machine at 1,300 rpm for 20 minutes to bring the average particle size (D50) to 0.5 μm or smaller.

The obtained ground slurry was granulated and dried using a thermal spray-dryer (spray-dryer "i-8", manufactured by Ohkawara Kakohki Co., Ltd). In so doing, the granulation and drying was carried out using a rotating disc to spray with a rotation speed of 24,000 rpm and a slurry supply amount of 12 kg/hr, and adjusting the temperature so that the drying tower exit temperature was 100° C.

Using a static electric oven, the obtained granulated powder was fired in an atmosphere at 950° C. for 70 hours and then heated in an atmosphere at 700° C. for 70 hours. The fired powder obtained by heating was sorted through a 75 μm opening-size sieve, and the powder under the sieve was recovered to obtain a spinel-type lithium-manganese composite oxide powder (sample).

Example 1

Into a handle-equipped plastic beaker (capacity: 2,000 mL), in which a volume of 2,000 mL of water at pH 6 to 7 and a temperature of 20° C. was placed, 1 kg of the spinel-type lithium-manganese composite oxide powder obtained in Comparative Example 1 was introduced, stirred at a rotation of 200 to 250 rpm for 10 minutes using an agitator (propeller surface area: 24 cm$^2$), and, once stirring was stopped and the agitator was removed from inside the water, left to stand undisturbed for 2 minutes. Then, up to 5/12 height of supernatant was removed by decantation, with the remainder, a suction filtration device (filter paper 131) was used to recover a precipitate, the recovered precipitate was dried by being left standing undisturbed in an environment at 120° C. for 24 hours, and then dried by further being left standing undisturbed for 24 hours in a heated state where the product temperature was 500° C. to obtain a spinel-type lithium-manganese composite oxide powder (sample).

Example 2

Except for the point that the firing temperature of the spinel-type lithium-manganese composite oxide powder used in Example 1, that is to say, the firing temperature of 950° C. in Comparative Example 1 was changed to 900° C., a spinel-type lithium-manganese composite oxide powder was obtained in a similar manner to Comparative Example 1, and then, a spinel-type lithium-manganese composite oxide powder (sample) was obtained by a similar procedure to Example 1.

Example 3

Except for the point that the firing temperature of the spinel-type lithium-manganese composite oxide powder used in Example 1, that is to say, the firing temperature of 950° C. in Comparative Example 1, was changed to 850° C., a spinel-type lithium-manganese composite oxide powder was obtained in a similar manner to Comparative Example 1, and then, a spinel-type lithium-manganese composite oxide powder (sample) was obtained by a similar procedure to Example 1.

Example 4-5

Except that lithium carbonate, electrolytic manganese dioxide, nickel hydroxide, titanium oxide and lithium tetraborate ($Li_2B_4O_7$) were weighed to yield the composition shown in Table 2, added with water and mixed by stirring, a spinel-type lithium-manganese composite oxide powder was obtained in a similar manner to Comparative Example 1, and then, a spinel-type lithium-manganese composite oxide powder (sample) was obtained by a similar procedure to Example 1.

Example 6

Except that lithium carbonate, electrolytic manganese dioxide, nickel hydroxide, titanium oxide, aluminum hydroxide and lithium tetraborate ($Li_2B_4O_7$) were weighed to yield the composition shown in Table 2, added with water and mixed by stirring, a spinel-type lithium-manganese composite oxide powder was obtained in a similar manner to Comparative Example 1, and then, a spinel-type lithium-manganese composite oxide powder (sample) was obtained by a similar procedure to Example 1.

<Measurement Methods for Various Physical Property Values>

Various physical property values of the spinel-type lithium-manganese composite oxide powders (samples) obtained in the examples and the comparative example were measured as follows:

(Specific Surface Area)

The specific surface areas of the spinel-type lithium-manganese composite oxide powders (samples) obtained in the examples and the comparative example were measured as follows and indicated in Table 1.

First, 0.5 g of a sample (powder) was weighed in a glass cell for MONOSORB LOOP (manufactured by Yuasa Ionics Inc., product name: MS-18), which is a specific surface area measurement device by the flow gas adsorption method, the interior of the glass cell was substituted with nitrogen gas for 5 minutes with a gas amount of 30 mL/min in a pretreatment device for the MONOSORB LOOP, and then heating was carried out at 250° C. for 10 minutes in the above nitrogen gas atmosphere. Thereafter, the sample (powder) was measured by the BET one point method using the MONOSORB LOOP.

Note that the adsorption gas used during the measurement was a mixed gas of 30% nitrogen:70% helium.

(D10, D50 and Dmin)

For the spinel-type lithium-manganese composite oxide powders (samples) obtained in the examples and the comparative example, using an automatic sample feeder ("Microtorac SDC" manufactured by Nikkiso Co., Ltd.) for laser diffraction particle size distribution meter, a sample (powder) was introduced into a water-soluble solvent, and in the middle of a 40% flow rate, irradiated by a 40 W ultrasound for 360 seconds, then, the laser diffraction particle size distribution meter "MT3000II" manufactured by Nikkiso Co., Ltd. was used to measure the particle size distribution, and D10, D50 and Dmin were measured from the obtained chart of the volume-based particle size distribution.

The water-soluble solvent for the measurements was passed through a 60 μm filter, the solvent refractive index was 1.33, particle permeability condition was permeable, particle refractive index was 2.46, shape was non-spherical form, the measurement range was 0.133 to 704.0 μm, the measurement time was 30 seconds, and the mean values from two measurements served as D10, D50 and Dmin.

(Supernatant/Precipitate Me-O Distance Ratio, and Li—O Distance)

Into a beaker (200 mL), in which 120 mL of ion-exchanged water (pH 6.8) at 20° C. was placed, 100 g of spinel-type lithium-manganese composite oxide (sample) was introduced and stirred at a rotation speed of 230 rpm for 10 minutes using a magnetic stirrer (magnetic bar: 5 cm in length and 2 cm in diameter). Thereafter, water was further added to bring the total amount to 180 mL, stirring was performed at a rotation speed of 230 rpm for 1 minute using the magnetic stirrer, then, the magnetic stirrer was stopped, removed from inside the water, and the beaker was left to stand undisturbed for 2 minutes. After being left standing undisturbed, the beaker was tilted to recover up to 5/12 height of a supernatant, and, with the recovered supernatant, a suction filtration device (filter paper 131) was used to recover the solid content in the supernatant.

Meanwhile, with the remainder of supernatant recovery, a suction filtration device (filter paper 131) was used to recover the solid content in the precipitate.

Then, after the solid content in the supernatant and the solid content in the precipitate were dried, a 75 μm-opening sieve was used for sorting, and the powder under the sieve was recovered and agitated for homogenization to obtain an XRD measurement sample.

(XRD Measurement)

In the XRD measurements, a non-reflective glass (C79298A3244B249, manufactured by Bruker AXS) was used as the sample holder.

The XRD measurement device "AXSD8 ADVANCE manufactured by Bruker" was used to perform measurements under the conditions given below and obtain an XRD pattern, and based on this, Rietveld analysis was performed with Topas Version 3 to measure the 16$d$-site-to-32$e$-site inter-atomic distance (Me-O distance, Å) and the 8$a$-site-to-32$e$-site inter-atomic distance (Li—O distance, Å).

In the Table, for each measurement sample, the Me-O distance (Å) is represented as "Me-O", the Li—O distance (Å) is represented as "Li—O", the proportion (%) of the supernatant Me-O distance with respect to the precipitate Me-O distance (100%) is represented as the "Me-O proportion", and the proportion (%) of the supernatant Li—O distance with respect to the precipitate Li—O distance (100%) is represented as the "Li—O proportion".

=XRD Measurement Conditions=
Beam source: CuKα; operation axis: 2θ/θ; measurement method: continuous;
count unit: cps
Start angle: 10°; end angle: 120°
Detector: PSD
Detector Type: VANTEC-1
High Voltage: 5585 V
Discr. Lower Level: 0.35 V
Discr. Window Width: 0.15 V
Grid Lower Level: 0.075 V
Grid Window Width: 0.524V
Flood Field Correction: Disabled
Primary radius: 250 mm
Secondary radius: 250 mm
Receiving slit width: 0.1436626 mm
Divergence angle: 0.3°
Filament Length: 12 mm
Sample Length: 25 mm
Receiving Slit Length: 12 mm
Primary Sollers: 2.623°
Secondary Sollers: 2.623°
Lorentzian,1/Cos: 0.004933548Th (Chemical Analysis)

For the spinel-type lithium-manganese-nickel composite oxide powders (samples) obtained in the examples and the comparative example, the content in each element was measured by ICP analysis. The measurement results are shown in Table 2. For the measurements, SPS-3520V manufactured by SII Nanotechnology was used.

<Battery Evaluation>

The spinel-type lithium-manganese composite oxide powders (samples) produced in the examples and the comparative example were used as positive electrode active substances to produce laminate-type batteries, which were used to conduct the following gas generation evaluation test and battery capability evaluation test.

(Production of Laminate-type Battery)

Mixed were 89 wt % of the spinel-type lithium-manganese composite oxide powders (samples) produced in the examples and the comparative example, 5 wt % of acetylene black as a conduction helper and 6 wt % of PVDF as a binder, which were prepared into paste form by adding NMP (N-methyl pyrrolidone). This paste was applied onto a 15 μm-thick Al foil collector, and dried at 120° C. Thereafter, a positive electrode sheet was produced by pressing to a thickness of 80 μm.

An 18 μm-thick copper foil was used as a negative electrode collector. Mixed were 92 wt % of graphite an active substance and 8 wt % of PVDF as a binder, which were prepared into paste form by adding NMP. This paste was applied homogeneously onto the negative electrode collector and dried at 100° C. Thereafter, a negative electrode sheet was produced by pressing to a thickness of 80 μm.

The positive electrode sheet obtained above was cut to a size of 2.9 cm×4.0 cm to serve as a positive electrode, while the negative electrode sheet obtained above was cut to a size of 3.1 cm×4.2 cm to serve as a negative electrode, and between the positive electrode and the negative electrode was placed a separator (porous polyethylene film) impregnated with an electrolytic solution comprising a mixed solvent of ethylene carbonate, ethylmethyl carbonate and dimethyl carbonate (volume ratio=20:20:60) into which $LiPF_6$ was dissolved so as to reach 1 mol/L and 2% by volume of vinylene carbonate was further added as an additive, to produce a laminate-type battery.

(Gas Generation Evaluation Test)

The laminate-type battery produced by the above method was left to stand undisturbed for 12 hours, then, charging was carried out at a current density of 0.2 mA/$cm^2$ in a measurement environment at 25° C. until the electric potential difference between the two electrodes was 4.9 V; thereafter, discharging was carried out at 0.2 mA/$cm^2$ until 3.0 V was reached. Thereafter, measurement environment temperature was changed to 45° C., the battery was left to stand undisturbed for 4 hours, charging was carried out at the same current value as above until the electric potential difference between the two electrodes was 4.9 V, this voltage was maintained for 7 days and then discharging to 3.0 V was performed.

The amount of generation (mL) for a gas generated up to this stage was measured by the immersion volume method (solvent exchange method based on Archimedes' principle).

The results of Table 1 are mean values from values measured for two laminate-type batteries, respectively.

TABLE 1

|  | D50 | D10 | Dmin | Specific Surface Area | Precipitate Side | | Supernatant Side | | Me—O Ratio | Li—O Ratio | Gas Generation |
|---|---|---|---|---|---|---|---|---|---|---|---|
|  | μm | μm | μm | M²/g | Me—O | Li—O | Me—O | Li—O | % | % | mL/g |
| Comparative Example 1 | 24 | 13.3 | 6.00 | 0.17 | 1.96 | 1.93 | 1.99 | 1.88 | 101.5 | 97.4 | 20.0 |
| Example 1 | 25 | 11.9 | 4.24 | 0.15 | 1.92 | 2.02 | 1.94 | 1.97 | 101.0 | 97.5 | 9.0 |
| Example 2 | 21 | 9.6 | 3.00 | 0.18 | 1.97 | 1.92 | 1.95 | 1.95 | 99.0 | 101.6 | 10.3 |
| Example 3 | 17 | 8.6 | 3.00 | 0.30 | 1.96 | 1.93 | 1.98 | 1.89 | 101.0 | 97.9 | 15.7 |
| Example 4 | 21 | 12.0 | 4.63 | 0.20 | 1.95 | 1.96 | 1.93 | 1.99 | 99.0 | 101.5 | 10.3 |
| Example 5 | 16 | 7.2 | 2.12 | 0.26 | 1.96 | 1.93 | 1.92 | 2.01 | 98.0 | 104.1 | 5.4 |
| Example 6 | 18 | 8.1 | 3.00 | 0.20 | 1.96 | 1.93 | 1.93 | 1.98 | 98.5 | 102.6 | 13.0 |

TABLE 2

| | Analysis Values (wt. %) | | | | |
|---|---|---|---|---|---|
| | Li | Mn | Ni | Ti | Al | B |
| Comparative Example 1 | 3.94 | 40.1 | 15.5 | 5.27 | <0.01 | 0.14 |
| Example 1 | 4.03 | 39.9 | 15.5 | 5.27 | <0.01 | 0.14 |
| Example 2 | 4.03 | 39.9 | 15.5 | 5.27 | <0.01 | 0.14 |
| Example 3 | 4.03 | 39.9 | 15.5 | 5.27 | <0.01 | 0.14 |
| Example 4 | 4.06 | 40.4 | 13.2 | 5.26 | <0.01 | <0.01 |
| Example 5 | 3.64 | 39.3 | 12.3 | 3.90 | <0.01 | 0.14 |
| Example 6 | 4.00 | 44.9 | 16.6 | 1.53 | 0.29 | 0.14 |

(Discussion)

From the above results, it was found that, when recovered after separation into a supernatant and a precipitate by exploiting a difference in sedimentation speeds as described above, if, with respect to the Me-O distance (100%) of the spinel-type lithium-manganese composite oxide contained in the precipitate, the Me-O distance of the spinel-type lithium-manganese composite oxide contained in the supernatant is less than 101.5% proportionally, then, the amount of generation for a gas generated via a reaction with the electrolytic solution could be limited effectively.

In addition, it was found that, when recovered after separation into a supernatant and a precipitate by exploiting a difference in sedimentation speeds as described above, if, with respect to the Li—O distance (100%) of the spinel-type lithium-manganese composite oxide contained in the precipitate, the Li—O distance of the spinel-type lithium-manganese composite oxide contained in the supernatant exceeds 97.4% proportionally, then, the amount of generation for a gas generated via a reaction with the electrolytic solution could be limited effectively.

Note that, while the above examples relate to 5 V spinels, it is possible to reason similarly regarding 4 V spinels having similar fundamental structures.

In addition, it was found that, since poor-quality fine powders, that is to say, low-crystallinity fine powders, were removed, attachment of attaching substances onto the porous separator after a charge-discharge cycle could be suppressed, and that discoloration of the separator could also be prevented.

In addition, since, as described above, low-crystallinity, poor-quality fine powders were removed and attachment of attaching substances onto the porous separator after a charge-discharge cycle can be suppressed, as a result, using the present invention spinel is thought to contribute to suppressing the extent of discoloration of a porous separator or a non-woven fabric, suppressing the amount of attaching substance, and suppressing the amount of generation of gas, inside a battery after a charge-discharge cycle.

In addition, the XRD patterns of the spinel-type lithium-manganese composite oxide powders (samples) obtained in Examples 1 to 3 and 5 to 6 were compared to the PDF (Powder Diffraction File) No. "01-079-1029"; as a result, it was confirmed that a crystal phase of $Ni_5MnO_4(BO_3)_2$ was contained.

The finding was obtained, that the high-temperature (for instance, 45° C.) discharge capacity maintenance rate was excellent for the spinel-type lithium-manganese composite oxide powder containing a crystal phase of $Ni_5MnO_4(BO_3)_2$ in this way, compared to a spinel-type lithium-manganese-nickel composite oxide powder not containing the crystal phase. As a reason for the high-temperature (for instance, 45° C.) discharge capacity maintenance rate being excellent for the spinel-type lithium-manganese composite oxide powder containing a crystal phase of $Ni_5MnO_4(BO_3)_2$, it is inferred that, probably, by covering with a composite oxide containing Ni, Mn and B the highly active positions on the surface of the spinel-type lithium-manganese-nickel composite oxide particle, the reaction between the spinel-type lithium-manganese-nickel composite oxide and the electrolytic solution could be suppressed, and as a result, the discharge capacity could be maintained even at a high temperature.

Since such effects are effects that are caused by the fact that a crystal phase of $Ni_5MnO_4(BO_3)_2$ is contained, it is possible to consider that a similar statement can be made for other 5 V-class spinels having similar issues.

In addition, it was observed that, when a boron compound was mixed into the raw materials and fired to produce a 4 V-class spinel-type lithium-manganese-nickel composite oxide or a layered lithium-manganese-nickel composite oxide, and the obtained lithium-manganese-nickel composite oxide was washed with water, the boron compound leached out; in contrast, in the spinel-type lithium-manganese composite oxide powders (samples) obtained in the above Example 1 to 3 and 5 to 6, the boron content almost did not change even when water-washed. From this, the mechanism of action of boron when mixing a boron compound into the raw materials and firing a 4 V-class spinel-type lithium-manganese-nickel composite oxide or a layered lithium-manganese-nickel composite oxide, and the mechanism of action of boron when mixing a boron compound into the raw materials and firing a 5 V-class spinel-type lithium-manganese-nickel composite oxide were found to be clearly different.

The invention claimed is:
1. A spinel-type lithium-manganese composite oxide comprising a crystal structure belonging to the space group Fd-3m, and at least Li, Mn, Ni and Ti wherein
when the spinel-type lithium-manganese composite oxide is placed in an ion-exchanged water at 20° C., stirred for

10 minutes, then, left to stand undisturbed for 2 minutes, separated into a supernatant and a precipitate, recovered them, the ratio of the "16$d$-site-to-32$e$-site inter-atomic distance" of the spinel-type lithium-manganese composite oxide contained in the supernatant to the "16$d$-site-to-32$e$-site inter-atomic distance (100%)" of the spinel-type lithium-manganese composite oxide contained in the precipitate measured by the Rietveld method using the fundamental method, is less than 101.5%, and the ratio of the "8$a$-site-to-32$e$-site inter-atomic distance" of the spinel-type lithium-manganese composite oxide contained in the supernatant to the "8$a$-site-to-32$e$-site inter-atomic distance (100%)" of the spinel-type lithium-manganese composite oxide contained in the precipitate measured by the Rietveld method using the fundamental method, exceeds 97.4%.

2. The spinel-type lithium-manganese composite oxide according to claim 1, comprising an operating electric potential of 4.5 V or higher with the reference electric potential of metal Li.

3. The spinel-type lithium-manganese composite oxide according to claim 1, comprising B.

4. The spinel-type lithium-manganese composite oxide according to claim 1, comprising the composite oxide phase comprising Ni, Mn and B, in addition to the spinel-type crystal phase comprising the crystal structure belonging to the space group Fd-3m.

5. The spinel-type lithium-manganese composite oxide according to claim 1, comprising a crystal phase of $Ni_5MnO_4(BO_3)_2$, in addition to the spinel-type crystal phase comprising the crystal structure belonging to the space group Fd-3m.

6. The spinel-type lithium-manganese composite oxide according to claim 1, wherein the specific surface area is 0.01 to 3.00 m²/g.

7. The spinel-type lithium-manganese composite oxide according to claim 1, wherein D50 is 5 μm to 40 μm according to a volume-based particle size distribution obtained from measurements by a laser diffraction/scattering particle size distribution measurement method.

8. The spinel-type lithium-manganese composite oxide according to claim 1, wherein D10 is 2 μm to 15 μm according to a volume-based particle size distribution obtained from measurements by a laser diffraction/scattering particle size distribution measurement method.

9. The spinel-type lithium-manganese composite oxide according to claim 1, wherein Dmin is 5.0 μm or smaller according to a volume-based particle size distribution obtained from measurements by a laser diffraction/scattering particle size distribution measurement method.

10. A lithium secondary battery comprising the spinel-type lithium-manganese composite oxide according to claim 1, as a positive electrode active substance.

11. The spinel-type lithium-manganese composite oxide according to claim 1, comprising at least Li, Mn, Ni, Ti and Al.

* * * * *